United States Patent
Hasegawa et al.

(10) Patent No.: US 8,050,065 B2
(45) Date of Patent: Nov. 1, 2011

(54) MULTI-PHASE VOLTAGE CONVERTING DEVICE, VEHICLE AND CONTROL METHOD OF MULTI-PHASE VOLTAGE CONVERTING DEVICE

(75) Inventors: Takahiko Hasegawa, Toyota (JP); Kota Manabe, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 240 days.

(21) Appl. No.: 12/517,229

(22) PCT Filed: Jan. 18, 2008

(86) PCT No.: PCT/JP2008/051028
§ 371 (c)(1),
(2), (4) Date: Jun. 2, 2009

(87) PCT Pub. No.: WO2008/090968
PCT Pub. Date: Jul. 31, 2008

(65) Prior Publication Data
US 2010/0002477 A1    Jan. 7, 2010

(30) Foreign Application Priority Data
Jan. 24, 2007   (JP) .................................. 2007-013901

(51) Int. Cl.
*H02M 7/00*   (2006.01)
(52) U.S. Cl. ...................................................... 363/65
(58) Field of Classification Search ............... 363/65–72
See application file for complete search history.

(56) References Cited

U.S. PATENT DOCUMENTS

| | | | | |
|---|---|---|---|---|
| 4,159,513 A | * | 6/1979 | Gemp et al. | 363/43 |
| 5,231,548 A | * | 7/1993 | Yamada et al. | 360/70 |
| 7,602,624 B2 | * | 10/2009 | Nakashima | 363/65 |
| 7,633,783 B2 | * | 12/2009 | Manabe et al. | 363/149 |
| 7,715,217 B2 | * | 5/2010 | Manabe et al. | 363/95 |
| 2005/0111605 A1 | * | 5/2005 | Loke et al. | 375/375 |

FOREIGN PATENT DOCUMENTS

| | | |
|---|---|---|
| JP | 9-215322 A | 8/1997 |
| JP | 10-127050 A | 5/1998 |
| JP | 11-289755 A | 10/1999 |
| JP | 2002-354798 A | 12/2002 |
| JP | 2004-357388 A | 12/2004 |
| JP | 2006-217759 A | 8/2006 |

* cited by examiner

*Primary Examiner* — Jessica Han
(74) *Attorney, Agent, or Firm* — Kenyon & Kenyon LLP (57) ABSTRACT

A multi-phase voltage converting device includes voltage converters each performing voltage conversion based on a control period selected from among a plurality of predetermined control periods, and a control device indicating the control period to the voltage converters. The control device updates the control period of voltage converters in a predetermined period related commonly to the plurality of control periods. The update period is a least common multiple of the plurality of control periods. The plurality of voltage converters are n in number, and the control device successively updates the control periods for the plurality of voltage converters with a time difference equal to 1/n of the update period. Thereby, the multi-phase voltage converting device suppressing output voltage ripples can be provided.

9 Claims, 7 Drawing Sheets

MULTI-PHASE VOLTAGE CONVERTING DEVICE, VEHICLE AND CONTROL METHOD OF MULTI-PHASE VOLTAGE CONVERTING DEVICE

This is a 371 national phase application of PCT/JP2008/051028 filed 18 Jan. 2008, claiming priority to Japanese Patent Application No. 2007-013901 filed 24 Jan. 2007, the contents of which are incorporated herein by reference.

TECHNICAL FIELD

The present invention relates to a multi-phase voltage converting device, a vehicle with the same and a control method of the multi-phase voltage converting device.

BACKGROUND ART

Japanese Patent Laying-Open No. 2004-357388 has disclosed a step-up/down converter of a multi-phase multiplex type that has a step-up function and a step-down function. This step-up/down converter is controlled such that currents having phases shifted from each other are passed for respective phases of the converter.

Figure 7:
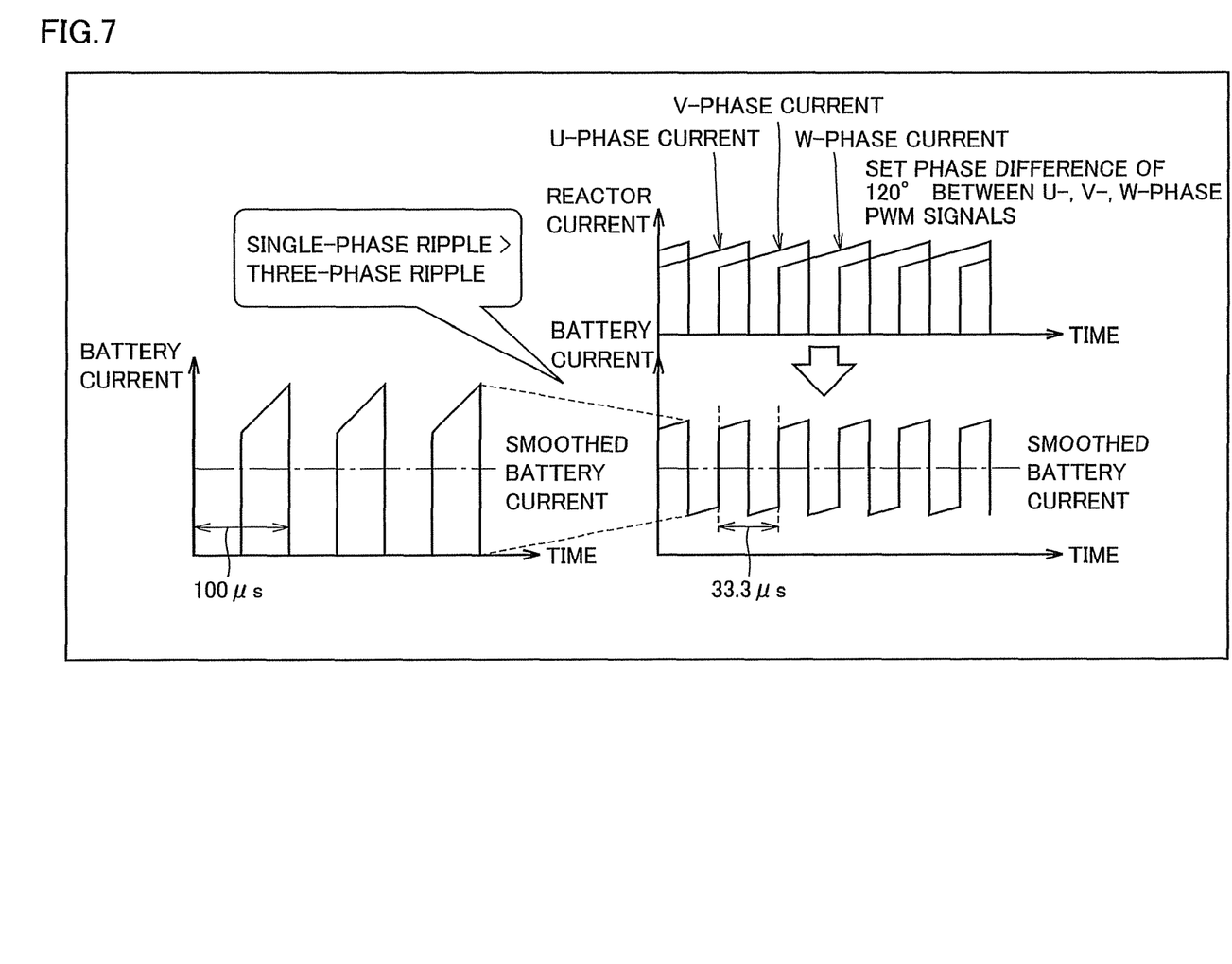
FIG. 7 is a waveform diagram for illustrating a multi-phase (three-phase) converter.

FIG. 7 is a waveform diagram for illustrating a multi-phase (three-phase) converter.

Referring to FIG. 7, for a single phase, a battery current that is not smoothed with a control period of 100 μs has a large amplitude, and a large ripple current flows even after the smoothing. Conversely, when a three-phase converter operates with the same control period, PWM signals of respective phases may have a phase difference of 120 degrees therebetween, and thereby a ripple current having a period of 33.3 μs and a reduced amplitude is passed in the smoothed battery current.

Thus, the three-phase converter causes the ripple current of a smaller amplitude than the single-phase converter.

The step-up/down converter described above is generally formed of a chopper circuit including reactors and switching elements.

Some kinds of such step-up/down converters control changing or switching of a switching period of the switching elements based on a passed power. An inverse number of the switching period is called a carrier frequency. For example, when the passed power is large, the control may take place to increase the switching period (i.e., to decrease the carrier frequency) for decreasing a switching loss.

Figure 8:
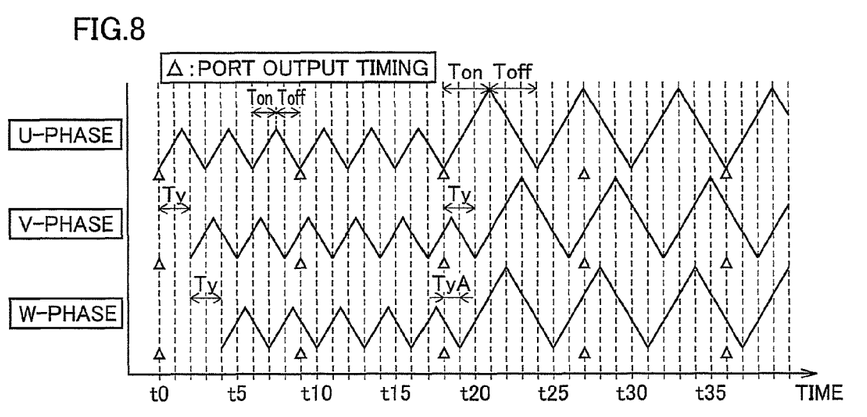
FIG. 8 shows an example of consideration for illustrating changing of the carrier frequency.

FIG. 8 shows an example of consideration for illustrating the changing of the carrier frequency.

Referring to FIG. 8, as can be seen from port output timing indicated by triangular marks, control information including a carrier frequency and a duty ratio is provided for a converter of three phases, i.e., Y-, V- and W-phases from a central control unit to a control unit of each phase. At times t0, t9, t18, t27 and t36 indicated by the triangular marks, the settings held in the control units for the respective phases are collectively rewritten. Each control unit executes the switching control of the corresponding phase based on the setting held thereby.

In each of U-, V- and W-phase current waveforms, an turned-on period Ton of the switching element is present between a downward peak point of the waveform and a subsequent upward peak point, and a turned-ff period Toff of the switching element is present between the upward peak point of the waveform and the subsequent downward peak point. The control period is equal to (Ton+Toff).

From time t0 to time t18, a time difference (phase difference) of Ty is present between the U-phase and the V-phase, and a time difference (phase difference) of Ty is also present between the V-phase and the W-phase.

At time t18, it is assumed that an instruction that doubles the control period with the duty ratio kept at 50% is issued simultaneously to all the phase control units. However, each phase control unit cannot change the control period at some midpoint in the control period.

Accordingly, the control period of the U-phase current waveform immediately doubles at time t18, but the control period of the V-phase doubles at time t20. The control period of the W-phase doubles at time t19.

Thus, the control period of each phase changes only when the ongoing control period expires (i.e., at the downward peak point) after the instruction is received.

In the example shown in FIG. 8, the control period of the W-phase changes earlier than the V-phase. Consequently, in the current waveform at and after time t20, time difference Ty is kept between the U- and V-phase current waveforms, but a time difference TyA different from that before time t18 occurs between the U- and W-phase current waveforms. Thus, such a result occurs that the same phase difference cannot be kept between the phases at the time of carrier switching. Consequently, the output voltage ripple of the multi-phase voltage converting device may be large.

DISCLOSURE OF THE INVENTION

An object of the invention is to provide a multi-phase voltage converting device suppressing an output voltage ripple, a vehicle provided with the same and a control method of a multi-phase voltage converting device.

In summary, the invention provides a multi-phase voltage converting device including a plurality of voltage converters connected in parallel between first and second nodes, and each performing voltage conversion based on a control period selected from among a plurality of predetermined control periods; and a control device indicating the control period to the plurality of voltage converters. The control device updates the control period for the plurality of voltage converters in a predetermined update period related commonly to the plurality of control periods.

Preferably, the update period is a least common multiple of the plurality of control periods. The plurality of voltage converters are n in number. The control device successively updates the control periods for the plurality of voltage converters with a time difference equal to 1/n of the update period.

Preferably, the control device includes a main control unit determining the control period; and a plurality of sub-control units arranged corresponding to the plurality of voltage converters, respectively. The plurality of sub-control units include setting information storage units storing information about the control periods obeyed by the corresponding voltage converters, respectively. The main control unit rewrites contents of the setting information storage units for updating the control periods.

Preferably, each of the plurality of voltage converters includes a reactor, a first current control unit provided between one end of the reactor and a first power supply node, and including a first switching element turned on in response to a first activation signal, and a second current control unit provided between a second power supply node different in potential from the first power supply node and the one end of the reactor, and including a second switching element being turned on in response to a second activation signal. The first power supply node is the first node. The control device indicates a duty ratio in the control period to each of the voltage converters for determining active periods of the first and second activation signals.

More preferable, the first current control unit further includes a first rectifier element provided in parallel with the first switching element and between the one end of the reactor and the first power supply node. The second current control unit further includes a second rectifier element provided in parallel with the second switching element and between the one end of the reactor and the second power supply node.

More preferably, each of the plurality of voltage converters further includes a third current control unit provided between the other end of the reactor and a third power supply node, and a fourth current control unit provided between the second power supply node and the other end of the reactor. The voltage converting device performs the voltage conversion between the first power supply node and the third power supply node. The third power supply node is the second node.

In another aspect of the invention, the invention provides a vehicle including one of the multi-phase voltage converting devices described above.

In still another aspect of the invention, the invention provides a control method of a multi-phase voltage converting device including a plurality of voltage converters connected in parallel between first and second nodes, and each performing voltage conversion based on a control period selected from among a plurality of predetermined control periods. The method includes a step of determining a first control period among the plurality of control periods based on a vehicle state; and a step of updating the control periods for the plurality of voltage converters in a predetermined update period related commonly to the plurality of control periods.

Preferably, the update period is a least common multiple of the plurality of control periods. The plurality of voltage converters are n in number. The updating step includes a step of successively updating the control periods for the plurality of voltage converters with a time difference equal to 1/n of the update period.

According to the invention, the output voltage ripple of the voltage converting device can be suppressed even when changing of the carrier takes place.

BEST MODES FOR CARRYING OUT THE INVENTION

Embodiments of the invention will be described below with reference to the drawings. In the following description, the same or corresponding portions bear the same reference numbers, and description thereof is not repeated.

Figure 1:
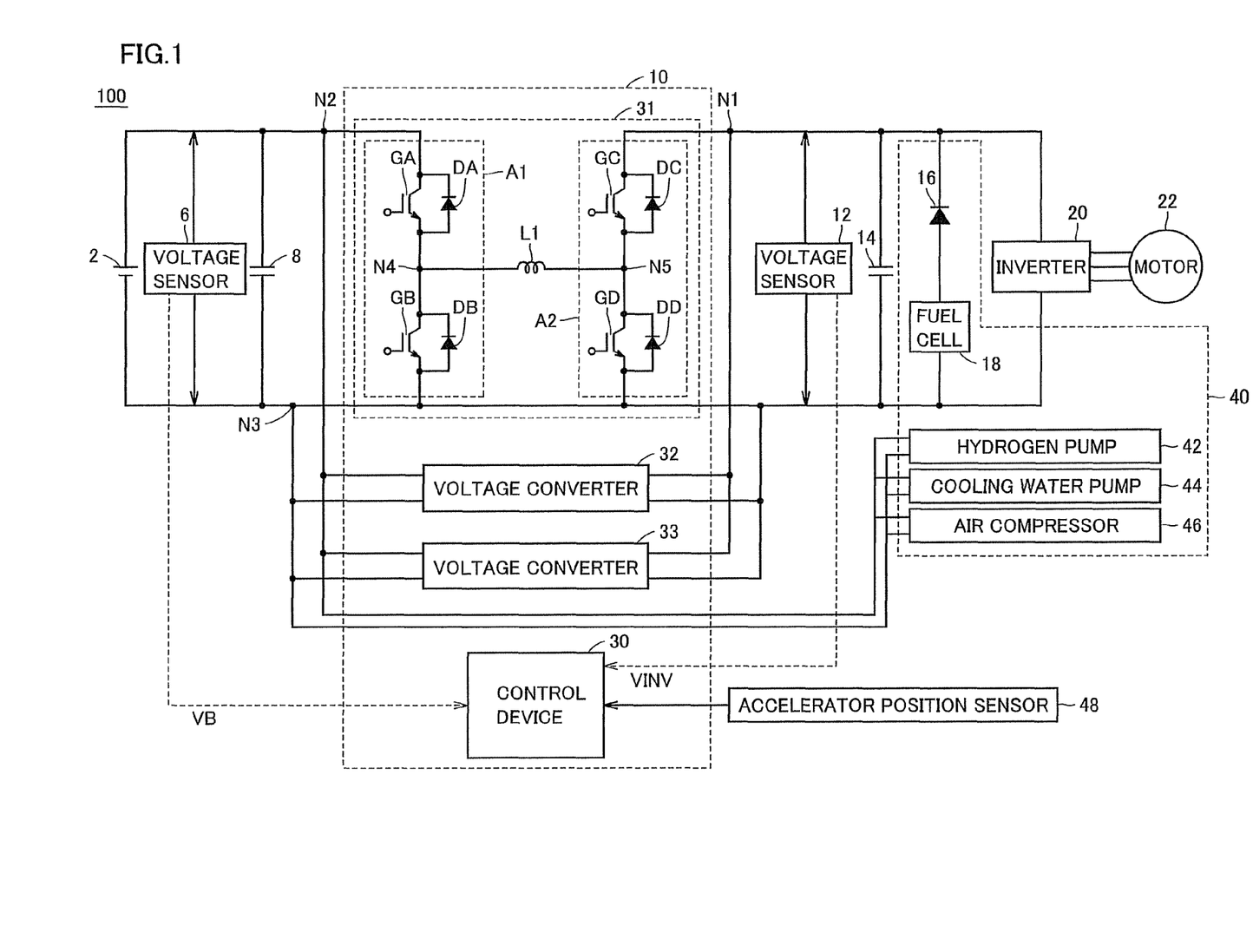
FIG. 1 is a circuit diagram showing a structure of a vehicle 100 according to an embodiment of the invention.

FIG. 1 is a circuit diagram showing a structure of a vehicle 100 according to the embodiment. Vehicle 100 is a fuel-cell electric vehicle that is an example of a vehicle equipped with en electric motor.

Referring to FIG. 1, vehicle 100 includes a battery 2 connected between nodes N2 and N3, a smoothing capacitor 8 connected between nodes N2 and N3, and a multi-phase voltage converting device 10 that is connected between nodes N2 and N3, and performs voltage conversion mutually between a voltage VB of the battery and a voltage VINV of an inverter.

Vehicle 100 further includes a smoothing capacitor 14 connected between nodes N1 and N3, an inverter 20 connected between nodes N1 and N3, a motor 22 driven by inverter 20, and a fuel cell system 40. Fuel cell system 40 includes a diode 16 and a fuel cell 18 connected in series between nodes N1 and N3, a hydrogen pump 42, a cooling water pump 44 and an air compressor 46.

Diode 16 is a protection element for preventing flowing of a current into fuel cell 18, and is connected such that a direction from the fuel cell toward node N1 is a forward direction. Fuel cell 18 is a power supply device that produces electricity and water by a chemical reaction between hydrogen and oxygen in the air. Hydrogen pump 42 feeds the hydrogen to fuel cell 18 from a high-pressure tank (not shown). Air compressor 46 compresses and supplies the air to fuel cell 18. Cooling water pump 44 circulates the cooling water for cooling fuel cell 18.

Hydrogen pump 42, cooling water pump 44 and air compressor 46 are connected to nodes N2 and N3 for receiving the electric power therefrom. Therefore, fuel cell 18 can generate the electric power even when multi-phase voltage converting device 10 is at rest.

Vehicle 100 further includes a voltage sensor 6 sensing voltage VB of the battery, a voltage sensor 12 sensing inverter voltage VINV and a control device 30.

Multi-phase voltage converting device 10 includes voltage converters 31-33 connected in parallel between nodes N1 and N2. Voltage converters 31-33 are commonly connected to node N3 for applying reference potentials of voltages VB and VINV to them.

Voltage converter 31 has a first arm A1 connected between nodes N2 and N3, a second arm A2 connected between nodes N1 and N3, and a reactor L1 connected between arms A1 and A2.

First arm A1 includes IGBT elements GA and GB connected in series between nodes N2 and N3, a diode DA connected in parallel to IGBT element GA, and a diode DB connected in parallel to IGBT element GB.

IGBT element GA has a collector and an emitter connected to nodes N2 and N4, respectively. Diode DA is connected such that a direction from node N4 toward node N2 is a forward direction.

IGBT element GB has a collector and an emitter connected to nodes N4 and N3, respectively. Diode DB is connected such that a direction from node N3 toward node N4 is a forward direction.

Second arm A2 includes IGBT elements GC and GD connected in series between nodes N1 and N3, a diode DC connected in parallel to IGBT element GC, and a diode DD connected in parallel to IGBT element GD.

IGBT element GC has a collector and an emitter connected to nodes N1 and N5, respectively. Diode DC is connected such that a direction from node N4 toward node N1 is a forward direction.

IGBT element GD has a collector and an emitter connected to nodes N5 and N3, respectively. Diode DD is connected such that a direction from node N3 toward node N5 is a forward direction.

Reactor L1 is connected between nodes N4 and N5.

The inner structures of voltage converters 32 and 33 are the same as that of voltage converter 31, and therefore description thereof is not repeated.

FIG. 1 shows the structure in which the emitters of IGBT elements GB and GD are connected together inside voltage converter 31, and thus shows the structure in which node N3 and a negative terminal of fuel cell 18 are connected together inside each of the plurality of voltage converters. However, the structure in FIG. 1 may be replaced with a structure in which the emitters of IGBT elements GB and GD are not connected together inside each voltage converter, and one interconnection shared among voltage converters 31-33 is arranged outside the voltage converters for connecting node N3 to the negative terminal of the fuel cell.

An attainable range of voltage VB of the battery partially overlaps an attainable range of the output voltage of fuel cell 18. It is assumed, e.g., that a nickel hydrogen battery is used as the foregoing battery, and the power supply voltage thereof is variable in a range from 200 V to 300 V. In this case, the output voltage of fuel cell 18 is variable in a range, e.g., from 240V to 400V.

Therefore, the voltage of battery 2 is higher than the output voltage of fuel cell 18 in some cases, and is lower than it in the other cases. Therefore, voltage converters 31-33 have the first and second arms as already described. This structure allows the step-up and step-down on the battery 2 side with respect to the inverter 20 side, and also allows the step-up and step-down on the inverter 20 side with respect to battery 2 side.

Then, the operation of control device 30 will be described.

Multi-phase voltage converting device 10 includes a plurality of voltage converters 31-33 connected in parallel between first and second nodes N2 and N1, and each performing the voltage conversion based on a control period selected from among a plurality of predetermined control periods, and control device 30 indicating the control period to the plurality of voltage converters 31-33. Control device 30 updates the control period for the plurality of voltage converters 31-33 in a predetermined update period related commonly to the plurality of predetermined control periods.

Preferably, each of the plurality of voltage converters 31-33 includes reactor L1, a first current control unit that is provided between one end (N4) of reactor L1 and a first power supply node (N2), and includes a first switching element GA being turned on in response to a first activation signal, and a second current control unit that is provided between a second power supply node (N3) different in potential from the first power supply node and the one end (N4) of reactor L1, and includes a second switching element GB being turned on in response to a second activation signal. The first power supply node is the foregoing first node. Control device 30 indicates the duty ratio in the control period to each of voltage converters 31-33 for determining active periods of the first and second activation signals.

More preferably, the first current control unit further includes a first rectifier element (DA) that is provided in parallel with first switching element GA and between one end (N4) of the reactor and the first power supply node (N2). The second current control unit further includes a second rectifier element (DB) that is provided in parallel with second switching element GB and between the one end (N4) of the reactor and the second power supply node (N3).

More preferably, each of the plurality of voltage converters 31-33 further includes third current control units (GC and DC) provided between the other end (N5) of reactor L1 and the third power supply node (N1), and fourth current control units (GD and DD) provided between the second power supply node (N3) and the other end (N5) of reactor L1. The voltage converting device performs the voltage conversion between the first and third power supply nodes (N2 and N1). The third power supply node is the foregoing second node.

Figure 2:
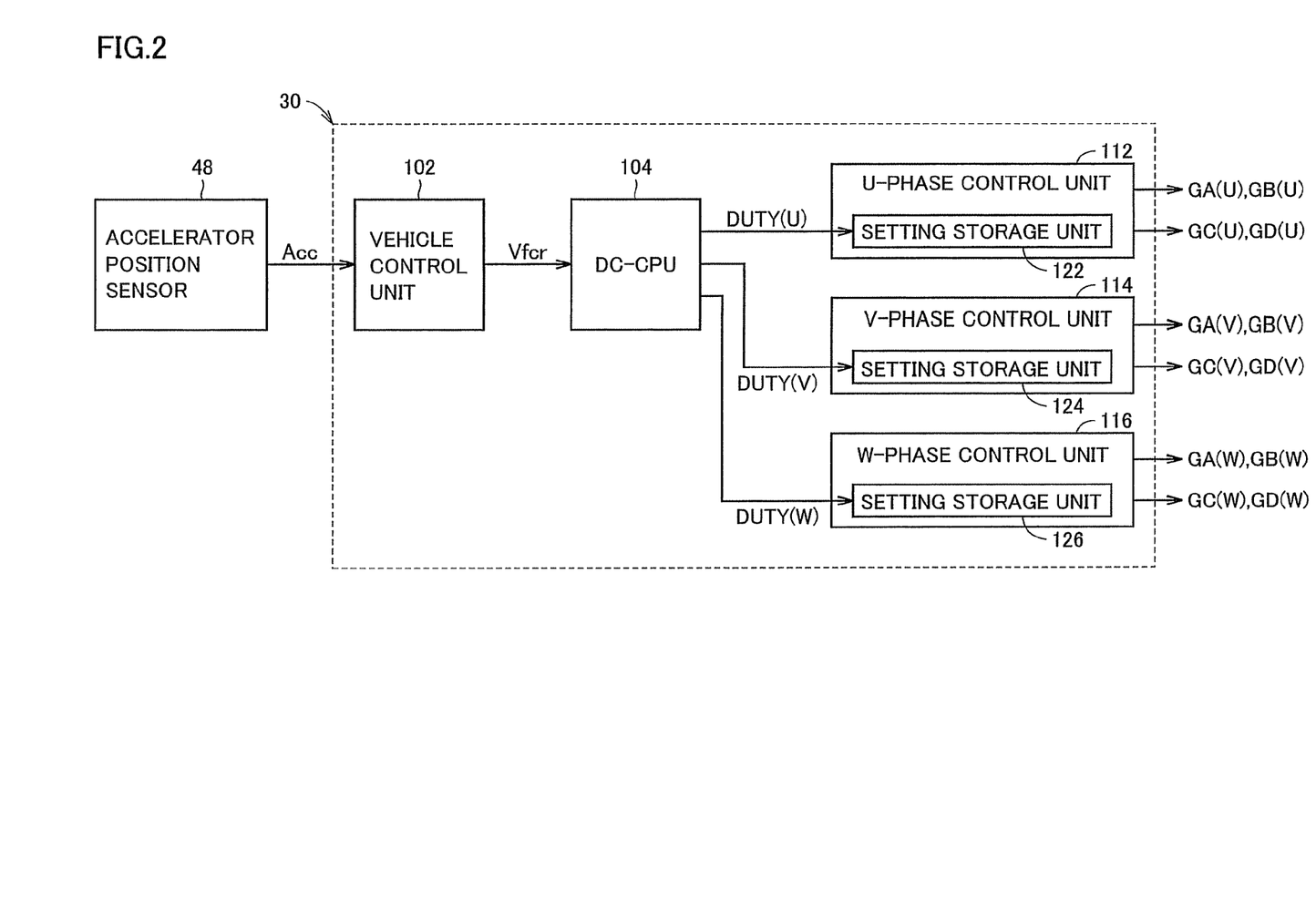
FIG. 2 is a functional block diagram showing structures of a control device 30 and voltage converters 31-33 in FIG. 1.

FIG. 2 is a functional block diagram showing structures of control device 30 and voltage converters 31-33 in FIG. 1. Control device 30 can be implemented by either of the software and hardware.

Referring to FIG. 2, control device 30 includes a vehicle control unit 102 outputting a voltage command value Vfcr based on an accelerator press-down degree Acc provided from an accelerator position sensor 48, and a DC-CPU 104 for voltage converter control. DC-CPU 104 outputs U-, V- and W-phase command signals DUTY(U), DUTY(V) and DUTY(W) based on voltage command value Vfcr.

Each of U-, V- and W-phase command signals DUTY(U), DUTY(V) and DUTY(W) includes information such as a control period (or carrier frequency) and a duty ratio. Instead of the control period and duty ratio, these phase signals may include a turn-on period Ton and a turn-off period Toff of the switching element.

Control device 30 further includes U-, V- and W-phase control units 112, 114 and 116.

U-phase control unit 112 includes a setting storage unit 122 that stores information transmitted by U-phase command signal DUTY(U). V-phase control unit 114 includes a setting storage unit 124 storing information transmitted by V-phase command signal DUTY(V). W-phase control unit 116 includes a setting storage unit 126 storing information transmitted by V-phase command signal DUTY(V).

Based on the information stored in setting storage unit 122, U-phase control unit 112 outputs control signals GA(U) and GB(U) controlling gates of corresponding IGBT elements GA and GB as well as control signals GC(U) and GD(U) controlling gates of corresponding IGBT elements GC and GD.

Based on the information stored in setting storage unit 124, V-phase control unit 114 outputs control signals GA(V) and GB(V) controlling gates of corresponding IGBT elements GA and GB as well as control signals GC(V) and GD(V) controlling gates of corresponding IGBT elements GC and GD.

Based on the information stored in setting storage unit 126, W-phase control unit 116 outputs control signals GA(W) and GB(W) controlling gates of corresponding IGBT elements GA and GB as well as control signals GC(W) and GD(W) controlling gates of corresponding IGBT elements GC and GD.

Contents stored in each of setting storage units 122, 124 and 126 are updated according to timing shifted from that of the other units as will be described later with reference to FIG. 5.

Preferably, the control period (carrier frequency) of each phase control unit is updated in a period equal to a least common multiple of the plurality of control periods. The plurality of voltage converters are n in number, and control device 30 successively updates the control periods for the plurality of voltage converters with a time difference equal to 1/n of the update period.

More specifically, since voltage converters 31-33 are employed, n is equal to three (n=3). When the control periods are two in number, and are equal to 100 μs (carrier frequency fc=10 kHz) and 200 µs (carrier frequency fc=5 kHz), respectively, the update period is 200 µs that is the least common multiple of 100 µs and 200 µs, and the time difference from the update time point of the first phase control period to the update time point of the second phase control period is equal to 66.6 µs (=200×⅓). The carrier frequencies may take three or more predetermined values.

Preferably, control device 30 includes main control unit DC-CPU 104 determining the control period, and a plurality of sub-control units, i.e., U-, V- and W-phase control units 112, 114 and 116 arranged corresponding to the plurality of voltage converters, respectively. U-, V- and W-phase control units 112, 114 and 116 include setting information storage units 122, 124 and 126 storing information about the control periods that the corresponding voltage converters obey, respectively. Main control unit DC-CPU 104 rewrites the contents of setting information storage units 122, 124 and 126 for updating the control periods.

Timing for rewriting such contents is determined such that the rewriting is not performed simultaneously for these phases, but the contents of each unit are rewritten according to the timing shifted from that of the other units by the foregoing time difference.

Control device 30 already described with reference to FIG. 2 may be implemented by software, using a computer.

Figure 3:
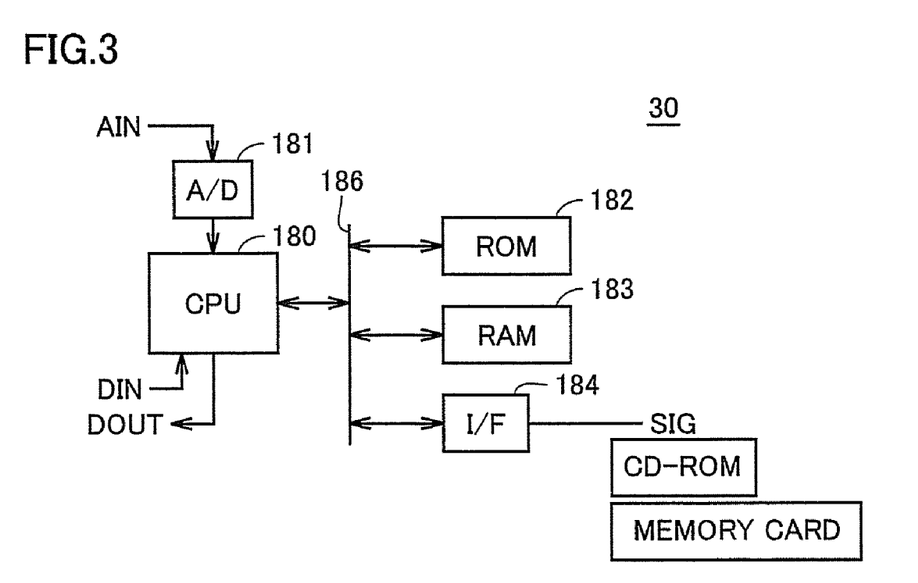
FIG. 3 shows a general structure employing a computer as control device 30.

FIG. 3 shows a general structure employing a computer as control device 30.

Referring to FIG. 3, control device 30 includes a CPU 180, A/D converter 181, ROM 182, RAM 183 and interface unit 184.

A/D converter 181 converts analog signals AIN such as outputs of various sensors into digital signals for providing them to CPU 180. CPU 180 is connected to ROM 182, RAM 183 and interface unit 184 by buses such as a data bus and an address bus for performing data transmission.

ROM 182 has stored a program executed by CPU 180 as well as data such as a map to be referred. RAM 183 is a work area used, e.g., for data processing by CPU 180, and temporarily stores various variables.

Interface unit 184 operates, e.g., to perform communications with another ECU, to perform input of the rewrite data and others when an electrically rewritable flash memory or the like is used as ROM 182, and to read a data signal SIG from a computer-readable storage medium such as a memory card or a CD-ROM.

CPU 180 transmits a data input signal DIN and a data output signal DOUT to/from the input/output port.

Control device 30 is not restricted to the above structures, and may include a plurality of CPUs.

Figure 4:
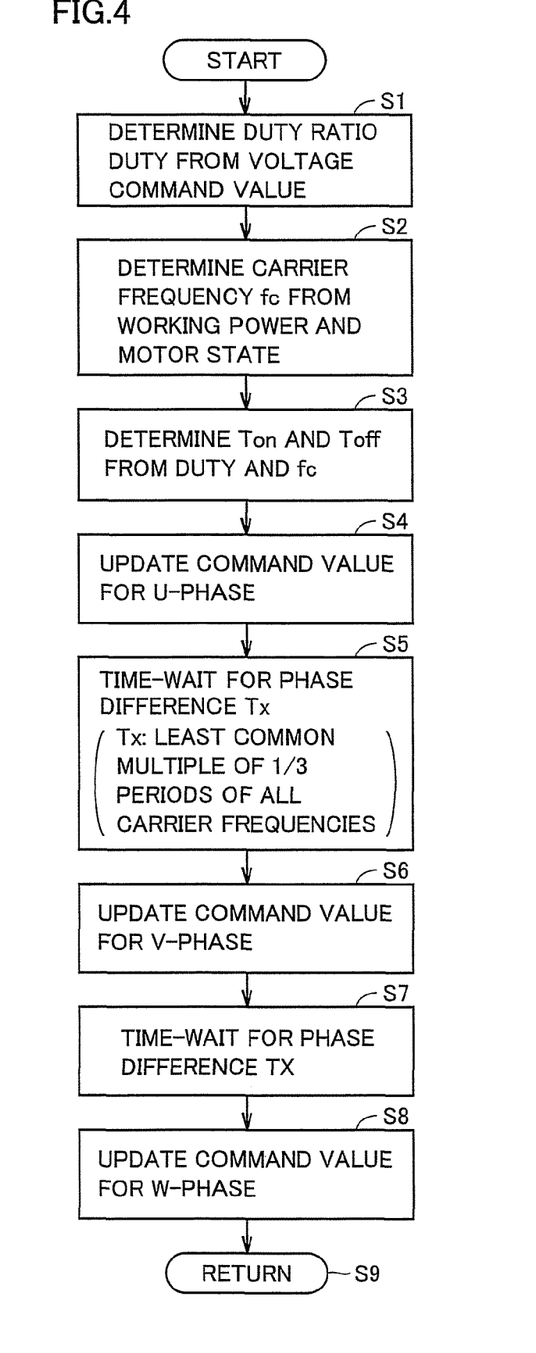
FIG. 4 is a flowchart for illustrating processing of control that relates to updating of command values for respective phase control units and is executed by control device 30.

FIG. 4 is a flowchart for illustrating control processing executed by control device 30 for updating the command values provided to the respective phase control units. The processing of this flowchart is called from a predetermined main routine and is executed at predetermined time intervals or when predetermined conditions are satisfied.

Referring to FIGS. 2 and 4, the operation of control device 30, i.e., a part of DC-CPU 104 will be described below.

First, in a step S1, DC-CPU 104 determines a duty ratio DUTY from voltage command value Vfcr that is provided from vehicle control unit 102. Duty ratio DUTY indicates a ratio of the on-time of the switching element of each phase voltage converter with respect to the control period.

Subsequently, DC-CPU 104 determines a carrier frequency (or control period) from a working power and a state of the motor.

Figure 5:
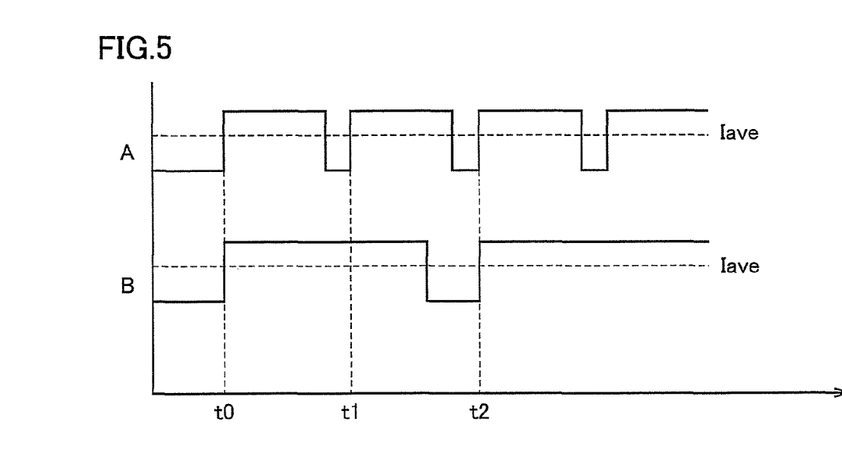
FIG. 5 illustrates a manner of switching carrier frequencies.

FIG. 5 illustrates changing of the carrier frequency.

For example, when the working power (or regenerative power) passed through the voltage converter is large, a larger current must be passed. In this case, the average current value can be changed by duty ratio DUTY.

As can be seen from a waveform A in FIG. 5, when the duty ratio takes a large value of about 80%, an average current value Iave approaches a peak value. However, when the control period is short (i.e., the carrier frequency is high), the number of times of switching of the switching element increases so that a loss increases. Therefore, by increasing the control period as shown by a waveform B to decrease the number of times of the switching, the switching loss can be recovered while passing the current of the same average current value Iave.

More specifically, according to waveform A, on/off of the switching element occurs twice during a period between times t0 and t2. However, according to waveform B, on/off occurs only once during the same period.

When the duty ratio is, e.g., 10% and average current value Iave is small, it is not preferable to increase the control period (to lower the carrier frequency) because this increases a ripple current.

As described above, carrier frequency fc is determined based on the working power. For example, a regenerative power occurs in the motor when the vehicle decelerates or brakes for preventing excessively acceleration on a downhill, and this regenerative power varies the working power so that carrier frequency fc is also determined based on the motor state.

Referring to FIG. 4 again, after carrier frequency fc is determined in a step S2, on- and off-times Ton and Toff of the switching element are determined in a subsequent step S3. More specifically, since control period T is an inverse of carrier frequency fc, the following equations are established.

$$Ton=(1/fc)\times DUTY \quad (1)$$

$$Toff=(1/fc)-Ton \quad (2)$$

Subsequently, in a step S4, DC-CPU 104 updates the control period by writing command value DUTY(U) containing information about on- and off-times Ton and Toff into setting storage unit 122 of U-phase control unit 112. Thereafter, U-phase control unit 112 outputs gate signals GA(U), GB(U), GC(U) and GD(U) based on the updated contents of setting storage unit 122.

Time-wait for a phase difference Tx is performed in a step S5. Phase difference Tx is a least common multiple of ⅓ the periods of the plurality of predetermined carrier frequencies. For example, the following description will be given on the case where two carrier frequencies (i.e., carrier 1 of 10 kHz and carrier 2 of 5 kHz) are predetermined, and are selectively used. The carrier 1 has period T of 100 µs, and (⅓×T) is equal to 33.3 µs. The carrier 2 has period T of 200 µs, and (⅓×T) is equal to 66.6 µs. Consequently, the least common multiple of ⅓ the periods is 66.6 µs, which is phase difference Tx.

When the three-phase voltage converting device is modified into an n-phase type, phase difference Tx may be the least common multiple of 1/n the periods of the plurality of predetermined carrier frequencies.

When the time corresponding to phase difference Tx elapses, the process proceeds to a step S6, in which DC-CPU 104 updates the control period by writing command value DUTY(V) containing information about on- and off-times Ton and Toff into setting storage unit 124 of V-phase control unit 114. Thereafter, V-phase control unit 114 outputs gate signals GA(V), GB(V), GC(V) and GD(V) based on the updated contents of setting storage unit 124.

Further, in a step S7, the time-wait for phase difference Tx takes place. Thereafter, the process proceeds to a step S8, in which DC-CPU 104 updates the control period by writing command value DUTY(W) containing information about on- and off-times Ton and Toff into setting storage unit 126 of W-phase control unit 116. Thereafter, W-phase control unit 116 outputs gate signals GA(W), GB(W), GC(W) and GD(W) based on the updated contents of setting storage unit 126.

Then, the control proceeds to a main routine in a step S9.

Referring to FIGS. 1 and 4, another aspect of the embodiment will be described below. This invention is a control method of multi-phase voltage converting device 10 including the plurality of voltage converters 31-33 connected in parallel between the first and second nodes (N2 and N1), and each performing the voltage conversion based on the control period selected from among the plurality of predetermined control periods. The control method includes step S2 of determining a first control period among the plurality of control periods based on a vehicle state (e.g., a position provided by accelerator position sensor 48 and a motor regeneration state), and steps S4-S8 of updating the control periods for the plurality of voltage converters 31-33 in a predetermined update period related commonly to the plurality of control periods.

Preferably, the update period is equal to a least common multiple of the plurality of control periods. The plurality of voltage converters are n in number, and the updating step includes steps S5-S8 of successively updating the control periods for the plurality of voltage converters with a time difference equal to 1/n of the update period.

This time difference will be specifically described with reference to a waveform diagram.

Figure 6:
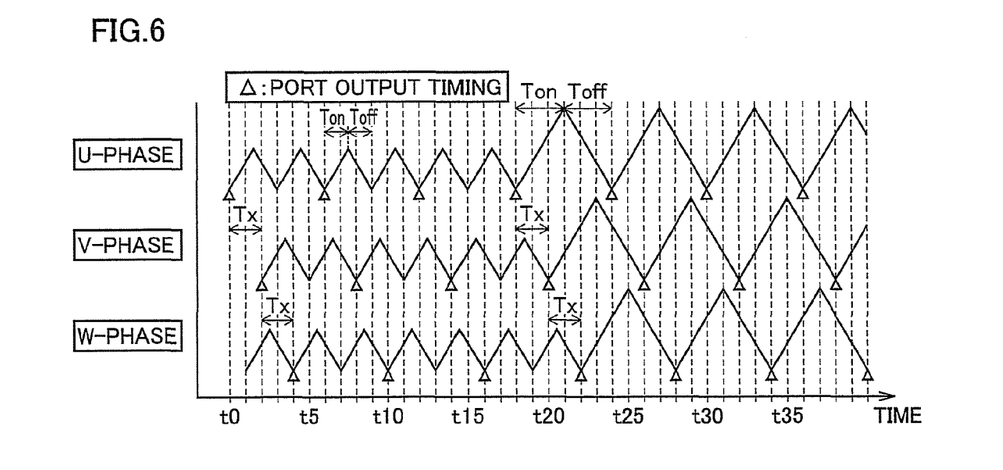
FIG. 6 is a waveform diagram showing reactor currents of respective phases in the case where the control shown in FIG. 4 is applied.

FIG. 6 is a waveform diagram showing reactor currents of the respective phases in the case where the control shown in FIG. 4 is applied.

Referring to FIG. 6, as can be seen from port output timing indicated by triangular marks, the control information including the carrier frequency and duty ratio is provided for the three, i.e., U-, V- and W-phase converters from DC-CPU 104 in FIG. 2 to U-, V- and W-phase control units 112, 114 and 116, respectively.

At times t0, t6, t12, t18, t24, t30 and t36 indicated by the triangular marks, respectively, the setting held in setting storage unit 122 of U-phase control unit 112 is rewritten. Based on the setting held in setting storage unit 122, U-phase control unit 112 executes the switching control of the U-phase.

At times t2, t8, t14, t20, t26, t32 and t38 that are shifted by phase difference Tx from the update timing of the U-phase and are indicated by the triangular marks, respectively, the setting held in setting storage unit 124 of V-phase control unit 114 is rewritten. Based on the setting held in setting storage unit 124, V-phase control unit 114 executes the switching control of the V-phase.

At times t4, t10, t16, t22, t28, t34 and t40 that are shifted by phase difference Tx from the update timing of the V-phase and are indicated by the triangular marks, respectively, the setting held in setting storage unit 126 of W-phase control unit 116 is rewritten. Based on the setting held in setting storage unit 126, W-phase control unit 116 executes the switching control of the W-phase.

In each of the U-, V- and W-phase current waveforms, turn-on period Ton of the switching element is present between the downward peak point of the waveform and the subsequent upward peak point thereof, and off-period Toff of the switching element is present between the upward peak point of the waveform and the subsequent downward peak point thereof. (Ton+Toff) is the control period.

From time t0 to time t18, the time difference (phase difference) of Tx is set from the U-phase to the V-phase, and also the time difference (phase difference) of Tx is set from the V-phase to the W-phase.

At time t18, a command for doubling the control period while keeping the duty ratio of 50% is provided to U-phase control unit 112. At t18, the U-phase reactor current waveform exhibits the downward peak so that the control period in the U-phase current waveform is immediately doubled at time t18.

At time t20 shifted by phase difference Tx from time t18, a command for doubling the control period while keeping the duty ratio of 50% is provided to V-phase control unit 114. At t20, the V-phase reactor current waveform exhibits the downward peak so that the control period can be immediately changed. Consequently, the control period in the V-phase current waveform is immediately doubled at time t20.

At time t22 shifted by phase difference Tx from time t20, a command for doubling the control period while keeping the duty ratio of 50% is provided to W-phase control unit 116. At t22, the W-phase reactor current waveform exhibits the downward peak so that the control period can be immediately changed. Consequently, the control period in the W-phase current waveform is immediately doubled at time t22.

Thus, control device 30 successively updates the control periods for the plurality of voltage converters 31-33 with the time difference (phase difference) equal to 1/n of the update period.

In a specific example, voltage converters 31-33 are employed so that n is equal to 3 (n=3). The plurality of control periods are 100 μs (carrier frequency fc=10 kHz) and 200 μs (carrier frequency fc=5 kHz), and thus are two in number. In FIG. 6, the control frequency of 100 μs in the first half changes into 200 μs in the second half. The update period, i.e., an interval between the neighboring triangular marks for a certain phase is 200 μs equal to the least common multiple of 100 μs and 200 μs. Phase difference Tx, i.e., the time difference from the time point of the updating of the U-phase control period to that of the V-phase control period can be 66.6 μs equal to (200×⅓) μs.

For the carrier frequency (or control period), the changing or switching instructions are provided to the respective phase control units with a phase difference as described above. Thereby, even after time t22, it is possible to keep a state that keeps a phase difference Tx of the V-phase current with respect to the U-phase current as well as phase difference Tx of the W-phase current with respect to the V-phase current. Therefore, it is possible to suppress the ripple current to the optimum degree even when the carrier frequency changes.

It is not essential that the time point of the foregoing change instruction matches the downward peak of the current waveform, provided that a phase difference is present between the time points where the change instructions are fed. By providing the phase difference in each phase, similar delays occur in the respective phases until the changing actually takes place after the reception of the change instruction. Consequently, the phase differences between the reactor current waveforms are held, and such a situation does not occur that the changing of a carrier for the W-phase takes place prior to that for the V-phase as shown in FIG. 8.

By designing the carrier frequency to set the update period and the phase difference between the phases as described above, the phase difference can be held even when a specific correction is not performed at the time of changing the carrier frequency.

The control method disclosed as the foregoing embodiment can be implemented by the software, using a computer. Programs for causing the computer to execute the control method can be read from a storage medium (ROM, CD-ROM, memory card or the like) bearing them in a computer-readable manner into the computer in the control device, or may be supplied over a communications line.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A multi-phase voltage converting device comprising:
   a plurality of voltage converters connected in parallel between first and second nodes, and each performing voltage conversion based on a control period selected from among a plurality of predetermined control periods; and
   a control device indicating said control period to said plurality of voltage converters, wherein
   said control device updates said control period for said plurality of voltage converters in an update period, the update period being equal to a least common multiple of said plurality of control periods.

2. The multi-phase voltage converting device according to claim 1, wherein
   said plurality of voltage converters are n in number, and
   said control device successively updates said control periods for said plurality of voltage converters with a time difference equal to 1/n of said update period.

3. The multi-phase voltage converting device according to claim 1, wherein
   said control device includes:
   a main control unit determining said control period, and
   a plurality of sub-control units provided corresponding to said plurality of voltage converters, respectively;
   said plurality of sub-control units include setting information storage units storing information about the control periods obeyed by the corresponding voltage converters, respectively; and
   said main control unit rewrites contents of said setting information storage units for updating said control periods.

4. The multi-phase voltage converting device according to claim 1, wherein
   each of said plurality of voltage converters includes:
   a reactor,
   a first current control unit provided between one end of said reactor and a first power supply node, and including a first switching element turned on in response to a first activation signal, and
   a second current control unit provided between a second power supply node different in potential from said first power supply node and said one end of said reactor, and including a second switching element being turned on in response to a second activation signal;
   said first power supply node is said first node; and
   said control device indicates a duty ratio in said control period to each of said voltage converters for determining active periods of said first and second activation signals.

5. The multi-phase voltage converting device according to claim 4, wherein
   said first current control unit further includes a first rectifier element provided in parallel with said first switching element and between said one end of said reactor and said first power supply node, and
   said second current control unit further includes a second rectifier element provided in parallel with said second switching element and between said one end of said reactor and said second power supply node.

6. The multi-phase voltage converting device according to claim 4, wherein
   each of said plurality of voltage converters further includes:
   a third current control unit provided between the other end of said reactor and a third power supply node, and
   a fourth current control unit provided between said second power supply node and said other end of said reactor
   said voltage converting device performs the voltage conversion between said first power supply node and said third power supply node; and
   said third power supply node is said second node.

7. A vehicle comprising the multi-phase voltage converting device according to claim 1.

8. A control method of a multi-phase voltage converting device including a plurality of voltage converters connected in parallel between first and second nodes, and each performing voltage conversion based on a control period selected from among a plurality of predetermined control periods, comprising the steps of:
   determining said control period among said plurality of control periods based on a vehicle state; and
   updating said control period for said plurality of voltage converters in an update period, the update period being equal to a least common multiple of said plurality of control periods.

9. The control method of the multi-phase voltage converting device according to claim 8, wherein
   said plurality of voltage converters are n in number, and
   said step of updating includes a step of successively updating said control periods for said plurality of voltage converters with a time difference equal to 1/n of said update period.

* * * * *